(No Model.)
H. LEITELT.
BALL BEARING.
No. 589,474.  Patented Sept. 7, 1897.
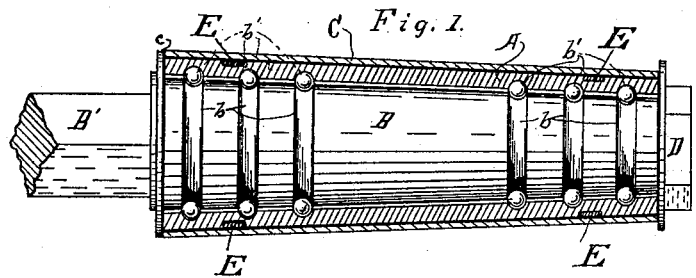
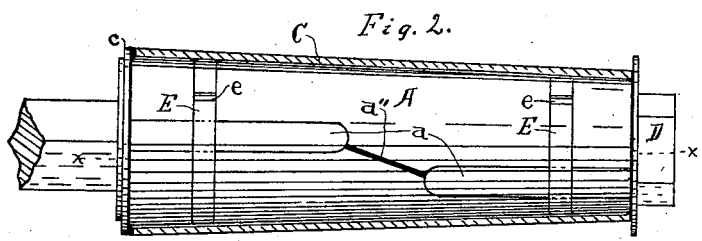
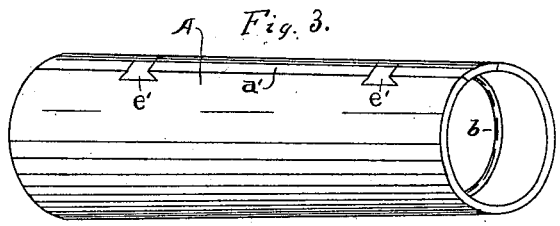
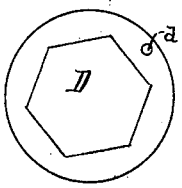
Witnesses.
John A. Gackeler
Joseph Post
Inventor.
Hermann Leitelt
By Ithriel J. Gilley
Attorney.

UNITED STATES PATENT OFFICE.

HERMANN LEITELT, OF GRAND RAPIDS, MICHIGAN.

BALL-BEARING.

SPECIFICATION forming part of Letters Patent No. 589,474, dated September 7, 1897.

Application filed September 14, 1896. Serial No. 605,835. (No model.)

*To all whom it may concern:*

Be it known that I, HERMANN LEITELT, a citizen of the United States, residing at Grand Rapids, in the county of Kent and State of Michigan, have invented certain new and useful Improvements in Ball-Bearings, of which the following is a specification.

My invention relates to improvements in multiple ball-bearings with which a long sleeve is used to cover and form the outer bearings for the balls, and its objects are, first, to provide for adjusting the bearing to meet any wear that may come upon the balls, and, second, to readily and effectually secure the caps in the openings for the introduction of the balls. I attain these objects by the mechanism illustrated in the accompanying drawings, in which—

Figure 1 is a longitudinal section of the sleeve on the line $xx$ of Fig. 2, with the end of the axletree in place. Fig. 2 is a longitudinal section of the outer sleeve, showing the inner sleeve in position and the plates provided for opening the side of the sleeve to introduce balls and also showing the means of providing for adjusting the inner sleeve. Fig. 3 is a perspective of the inner sleeve with a modified form of opening-plate, and Fig. 4 is an end elevation of the nut.

Similar letters refer to similar parts throughout the several views.

A is the inner sleeve, B is the end of the axletree B', C is the outer sleeve, $b$ are the grooves, and $b'$ are the balls, all of which are common in this class of ball-bearings, as are also the plates $a$.

My invention consists of the cutting of the slot $a''$ in the sleeve A'' between the ends of the openings that are filled by the plates $a$, so that the inner sleeve may be forced together, when desired, to adjust its size to correspond with the size of the balls. This is accomplished by making the inner sleeve slightly tapering, so that the forcing of the outer sleeve upon it will draw it together uniformly around the balls, which is accomplished by means of the nut D, in the usual manner.

In Fig. 3 I show a modified form of sleeve— that is, a sleeve having the ball-opening and the plate $a'$ continuous the entire length of the sleeve. It will be noticed that the plate is wedging as it enters the opening, so that it is supported from dropping into the hollow of the sleeve.

My device for holding the plates to place, Figs. 1 and 2, consists of spring-rings E, that are fitted into grooves around the inner sleeve in the most advantageous position to hold the plates. These rings are divided, as at $e$, so that they may be turned around to position to allow the plates to be readily removed or replaced. I do not restrict myself to this special means for securing the plates, as other forms are equally available, and in some instances more so—as, for instance, the dovetailed slides $e'$, by means of which the plates may be securely fastened to place.

When it is desirable to contract the diameter of the inner sleeve, the plates $a$ or plate $a'$ will have to be made correspondingly narrow by filing off the edges as needed, and to readjust them to the larger diameter a thin piece of paper packing may be inserted at the edges.

I sometimes make an aperture $d$ through the rim of the nut D, by means of which I can secure the nut to the wooden hub by means of screws or other suitable device to prevent it from working loose.

Having thus fully described my invention, what I claim as new, and desire to secure by Letters Patent of the United States, is—

1. In a ball-bearing, an outer sleeve, an inner slotted sleeve, each of said sleeves tapered so that the outer one may be made to encompass the inner one and draw it snugly to place, an axletree end fitted with grooves for the reception of balls, there being corresponding grooves in the inner surface of the inner sleeve, balls to travel in said grooves, in combination with a removable plate fitted in the inner sleeve and adapted to be reduced in size to allow the inner sleeve to be contracted by the action of the outer sleeve, substantially as and for the purpose set forth.

2. An outer tapering sleeve and an inner tapering and slotted sleeve, the inner sleeve being grooved for the reception of balls to form a ball-bearing, an axletree correspondingly grooved, balls in said grooves, plates in slots in the inner sleeve, adapted to be reduced in width to reduce the size of the inner sleeve, means for holding the plates in place when the outer sleeve is removed, and means for forcing the outer sleeve upon the inner sleeve, substantially as and for the purpose stated.

Signed at Grand Rapids, Michigan, September 11, 1896.

HERMANN LEITELT.

In presence of—
I. J. CILLEY,
GEORGIA E. CILLEY.